(12) United States Patent
Kane

(10) Patent No.: US 9,109,573 B2
(45) Date of Patent: Aug. 18, 2015

(54) BLUFF BODY TURBINE AND METHOD

(71) Applicant: Elizabeth Kane, Ottawa (CA)

(72) Inventor: Elizabeth Kane, Ottawa (CA)

(73) Assignee: INCURRENT TURBINES LTD., Ottawa (CA)

(*) Notice: Subject to any disclaimer, the term of this patent is extended or adjusted under 35 U.S.C. 154(b) by 119 days.

(21) Appl. No.: 13/668,821

(22) Filed: Nov. 5, 2012

(65) Prior Publication Data
US 2013/0200628 A1    Aug. 8, 2013

Related U.S. Application Data

(63) Continuation-in-part of application No. 13/420,798, filed on Mar. 15, 2012, now Pat. No. 8,928,167.

(60) Provisional application No. 61/594,412, filed on Feb. 3, 2012.

(51) Int. Cl.
F03B 13/00    (2006.01)
H02P 9/04    (2006.01)
F03B 17/06    (2006.01)

(52) U.S. Cl.
CPC ........... *F03B 17/062* (2013.01); *F05B 2240/30* (2013.01); *F05B 2240/31* (2013.01); *F05B 2240/32* (2013.01); *F05B 2240/97* (2013.01); *Y02E 10/28* (2013.01); *Y02E 10/721* (2013.01)

(58) Field of Classification Search
USPC .......................................... 290/42, 43, 53, 54
See application file for complete search history.

(56) References Cited

U.S. PATENT DOCUMENTS

| | | | |
|---|---|---|---|
| 3,572,117 A | 3/1971 | Rodely | |
| 7,224,077 B2 | 5/2007 | Allen | |
| 7,989,973 B2 * | 8/2011 | Birkestrand | 290/44 |
| 2006/0064972 A1 | 3/2006 | Allen | |
| 2008/0048455 A1 | 2/2008 | Carney | |

FOREIGN PATENT DOCUMENTS

EP    0048588 A1    3/1982

OTHER PUBLICATIONS

International Search Report dated Apr. 12, 2013 in corresponding International Application No. PCT/CA2013/050022.

\* cited by examiner

*Primary Examiner* — Tulsidas C Patel
*Assistant Examiner* — Thomas Quigley
(74) *Attorney, Agent, or Firm* — The Law Firm Office of Michael E. Kondoudis

(57) ABSTRACT

A passive bluff body is disposed in flowing fluid for generating power. The shape of the bluff body supports a predetermined oscillatory clockwise and counter clockwise movement about a pivot absent the influence of electrical or mechanical devices for biasing the bluff body's motion for a given velocity, or range of velocities, of the fluid flow.

19 Claims, 13 Drawing Sheets

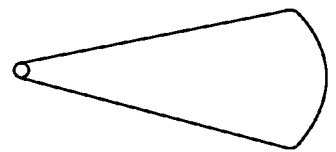
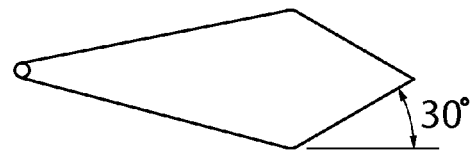
FIG.11a   FIG.11b
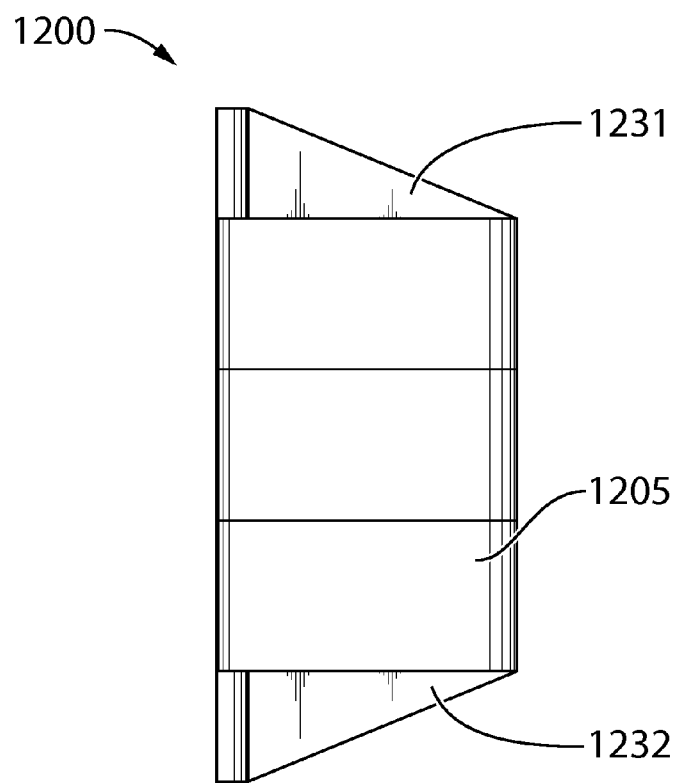
FIG.12

BLUFF BODY TURBINE AND METHOD

FIELD OF THE INVENTION

The invention relates to power generation and more particularly to bluff body power generation.

BACKGROUND

In power generation creating power from renewable resources is a growing industry. As the global population increases, so does the need for more power. Existing power systems struggle to meet the demand of their customers. Our environmentally conscious society, while demanding more power, also desires clean renewable sources of energy. While hydro-electric power is generated via a renewable resource, water, the effects on the environment can be devastating. Damming a river causes flooding of large areas of land, destroying the natural environment of the local area. Fish populations can be impacted if fish cannot migrate upstream to spawning grounds or if they cannot migrate downstream to the ocean.

Development of other power generating technologies have emerged from the desire for renewable energy sources, for example, the sun. Solar energy is an attractive renewable resource however, there are several disadvantages associated with implementing a solar energy system. Solar panels are expensive to purchase and costly to maintain. Installation is a challenge as a large area is needed to install the panels. Also, harnessing solar power is not ideal in northern climes where there are few hours of sunlight.

Wind farms have emerged as another method for harnessing power from a renewable resource. Large numbers of wind turbines are placed on top of hills to maximize wind flow and are prominent along the horizon, consequently they are often viewed as eyesores. Other disadvantages include intruding on birds' migrational flight paths, as they pose a risk to birds flying between the turbine blades. Also, those living near wind farms are exposed to noise which is intrusive and out of place in the country side where they are often located.

The use of bluff bodies in air or water to generate electricity is another example of a harnessing the power of renewable source of energy. In U.S. Pat. No. 7,224,077 B2, "Bluff Body Energy Converter", for example, a bluff body mounted for rotation is disposed in a stream perpendicular to the oncoming flow. Vortices that occur about the bluff body cause it to move and an impedance matching system is employed for varying the natural frequency characteristics of the bluff body, such that it oscillates—moves back and forth—at a frequency. The disclosed bluff body energy converter comprises a complex feedback system to determine when the natural frequency characteristics of the bluff body change. Also, such a complex system often requires regular maintenance and calibration.

It would be advantageous to overcome some of the disadvantages of the prior art.

SUMMARY OF THE INVENTION

In accordance with an embodiment of the invention there is provided a method of generating electric current comprising providing an apparatus comprising a pivot, a generator, a first part and a second part, the first part for pivoting relative to the second part about the pivot and comprising at least a back wall having a first portion facing in a first direction and a second other portion facing in a second direction relative to the first direction, the generator for generating electric current in response to relative motion about the pivot between the first part and the second part; and disposing the first part within a fluid flow, the first part shaped for, in response to the fluid flow, oscillating in alternating directions in a predetermined fashion.

In accordance with an embodiment of the invention there is provided an apparatus for generating electric current comprising: a pivot; a bluff body comprising: at least a front wall for being directed into a fluid flow, the at least a front wall comprising rounded corners disposed at opposing ends thereof; an opening for mating with the pivot for supporting rotation of the bluff body thereabout; a back wall comprising having a first portion facing in a first direction and a second other portion facing in a second direction relative to the first direction, the backwall coupled at opposing ends thereof to the at least a front wall by way of the rounded corners, the bluff body for when disposed in a flowing fluid with velocity v1 resulting in vortex shedding for inducing a predetermined oscillating movement about the pivot for resulting in relative motion between the pivot and the bluff body; and a generator coupled between the pivot and the bluff body for generating electric current in response to the relative motion.

In accordance with an embodiment of the invention there is provided an apparatus for generating electric current comprising: a pivot; a three dimensional triangular shaped bluff body comprising: a first sidewall and a second sidewall coupled together at an apex for being directed into a fluid flow; an opening for mating with the pivot for supporting rotation of the bluff body thereabout; at least a back wall having a first portion facing in a first direction and a second other portion facing in a second direction relative to the first direction; a second rounded corner opposite the apex and between the first sidewall and the at least a back wall; a third rounded corner opposite the apex and between the second sidewall and the at least a back wall, for when disposed in a flowing fluid with velocity v1 resulting in vortex shedding for inducing a predetermined oscillating movement about the pivot for resulting in relative motion between the pivot and the bluff body; and a generator coupled between the pivot and the bluff body for generating electric current in response to the relative motion.

In accordance with an embodiment of the invention there is provided an apparatus for generating electric current comprising: a pivot; a three dimensional triangular shaped bluff body comprising: a first sidewall and a second sidewall coupled together at an apex for being directed into a fluid flow; an opening for mating with the pivot for supporting rotation of the bluff body thereabout; at least a back wall having a first portion facing in a first direction and a second other portion facing in a second direction relative to the first direction; a second rounded corner opposite the apex and between the first sidewall and the at least a back wall; a third rounded corner opposite the apex and between the second sidewall and the at least a back wall, for when disposed in a flowing fluid with velocity v1 resulting in vortex shedding for inducing a predetermined oscillating movement about the pivot for resulting in relative motion between the pivot and the bluff body; and a generator coupled between the pivot and the bluff body for generating electric current in response to the relative motion.

In some embodiments there is provided an apparatus for generating electric current wherein normal lines to the surface of the back wall other than cross.

In some embodiments there is provided an apparatus for generating electric current wherein the at least a back wall comprises a curved surface extending between the second rounded corner and the third rounded corner.

In some embodiments there is provided an apparatus for generating electric current wherein the first portion of the at least a back wall comprises a first back surface extending from the second rounded corner and the second portion of the at least a back wall comprises a second back surface extending from the third rounded corner, the second back surface at an angle to the first back surface.

In some embodiments there is provided an apparatus for generating electric current wherein the first back surface and the second back surface are joined by a fourth corner.

In some embodiments there is provided an apparatus for generating electric current wherein the first back surface and the second back surface are joined by a third back surface.

In some embodiments there is provided an apparatus for generating electric current comprising vortex separation vanes disposed on the bluff body and directed along a direction of fluid flow.

In some embodiments there is provided an apparatus for generating electric current wherein the second corner and the third corner have a diameter of curvature and wherein the vortex separation vanes are disposed apart between 7 and 20 times the diameter of curvature.

In some embodiments there is provided an apparatus for generating electric current comprising a top cap disposed at a top of the bluff body and extending beyond a back thereof along a direction of fluid flow.

In some embodiments there is provided an apparatus for generating electric current comprising a bottom cap disposed at a bottom of the bluff body and extending beyond a back thereof along a direction of fluid flow.

In some embodiments there is provided an apparatus for generating electric current wherein the top cap and the bottom cap are parts separate from the bluff body and adjacent thereto supporting relative movement therebetween.

In accordance with an embodiment of the invention there is provided an apparatus for generating electric current comprising: a pivot; a three dimensional triangular shaped bluff body comprising: a first sidewall and a second sidewall coupled together at an apex for being directed into the fluid flow; an opening for mating with the pivot for supporting rotation of the bluff body thereabout; at least a back wall; a second rounded corner opposite the apex and between the first sidewall and the back wall; a third rounded corner opposite the apex and between the second sidewall and the back wall; a first vortex separation vane along each of the first and second sidewalls, the vortex separation vane extending in a direction of fluid flow, for when disposed in a flowing fluid with velocity v1 resulting in vortex shedding for inducing a predetermined oscillating movement about the pivot for resulting in relative motion between the pivot and the bluff body; and a generator coupled between the pivot and the bluff body for generating electric current in response to the relative motion.

In some embodiments there is provided an apparatus for generating electric current comprising a second vortex separation vane spaced from the first vortex separation vane by 7 to 20 times the diameter of curvature of the second rounded corner.

In accordance with an embodiment of the invention there is provided an apparatus for generating electric current comprising: a pivot; a three dimensional triangular shaped bluff body comprising: a first sidewall and a second sidewall coupled together at an apex for being directed into the fluid flow; an opening for mating with the pivot for supporting rotation of the bluff body thereabout; at least a back wall; a second rounded corner opposite the apex and between the first sidewall and the back wall; a third rounded corner opposite the apex and between the second sidewall and the back wall, for when disposed in a flowing fluid with velocity v1 resulting in vortex shedding for inducing a predetermined oscillating movement about the pivot for resulting in relative motion between the pivot and the bluff body; and a top cap for moving relative to the bluff body and adjacent a top thereof and extending beyond the back wall thereof; a generator coupled between the pivot and the bluff body for generating electric current in response to the relative motion.

In some embodiments there is provided an apparatus for generating electric current comprising a bottom cap for moving relative to the bluff body and adjacent a bottom thereof and extending beyond the back wall thereof.

BRIEF DESCRIPTION OF THE DRAWINGS

The features and advantages of the invention will become more apparent from the following detailed description of the preferred embodiment(s) with reference to the attached figures, wherein:

FIG. 1b is a side view of the bluff body turbine of FIG. 1a.

FIG. 3b is a top view of the bluff body turbine of FIG. 3a.

FIG. 5b is a top view of the bluff body turbine of FIG. 5a.

FIG. 6b is a top view of the bluff body turbine of FIG. 6a.

FIG. 11(a) is a top view of a bluff body with a rounded back wall.

FIG. 11(b) is a top view of a bluff body with an angular back wall.

FIG. 12 is a side view of a bluff body having a curved top and bottom cap.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Vortices are formed when fluid flows past a blunt object. These vortices have an ability to bias the blunt object.

Vortex shedding is caused when a fluid flowing past a blunt object creates alternating low pressure zones on the downstream side of the blunt object. Vortex shedding is a problem that needs addressing, for example in chimney design as when the fluid flow is at a critical velocity, the vortex shedding results in a resonant oscillation.

A bluff body is an object that produces resistance when immersed in a moving fluid. A region of separated flow occurs over a large portion of the surface resulting in vortex formation proximate a vortex inducing feature thereof.

A vortex inducing feature is a feature within a bluff body shaped for inducing a predictable vortex proximate the vortex inducing feature when the bluff body is in a first position relative to the fluid flow, the predictable vortex for biasing the bluff body to move in a predetermined direction.

A line is curved when it deviates from straightness in a smooth, continuous fashion.

Figure 1A:
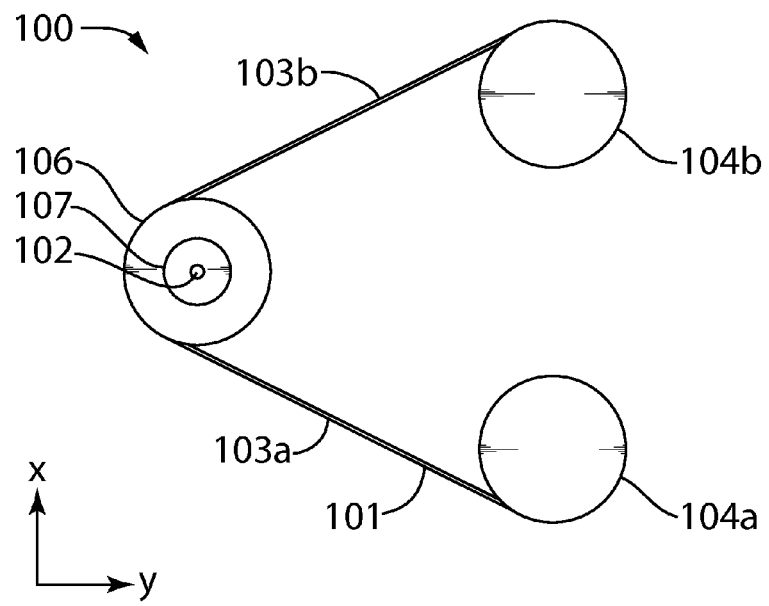
FIG. 1a is a top view of a bluff body turbine having a general wedge shape and having cylindrical vortex inducing features.

Shown in FIG. 1a is a bluff body turbine (BBT) according to an embodiment of the invention. BBT 100 comprises a bluff body 101, a pivot 102 and a power generator, for example a stator 107 and a rotor 106. Bluff body 101 freely rotates 360° about pivot 102, which is in an approximately fixed position. Rotor 106 is coupled to bluff body 101, and stator 107 is coupled to pivot 102, such that in use rotor 106 moves rotationally about stator 107 as bluff body 101 moves about pivot 102. The relative motion between stator 107 and rotor 106 is used to generate electric current. Bluff body 101 comprises sidewalls 103a-b and vortex inducing features in the form of cylinders 104a-b, located at the opposite end of sidewalls 103a-b from pivot 102 along the length of bluff body 101 parallel to the y-axis. Sidewall 103a faces in a first direction and sidewall 103b faces in an approximately opposing second direction.

In FIG. 1a, bluff body 101 is fabricated from a single piece of material. Sidewalls 103a-b and cylinders 104a-b are integrally formed. Construction material of bluff body 101 is rigid and water resistant for other than absorbing significant proportions of the forces of the fluid flow, for enhanced movement of bluff body 101 as forces from the fluid flow act on BBT 100. An example of a bluff body construction material is hard plastic. Also, a bluff body is constructed from material strong enough to endure forces exerted by the fluid flow. The materials described are water resistant as the bluff body of the present embodiment is for being disposed in bodies of water or exposed to rain. BBT 100 is an open body, however, rotor 106 and stator 107 are protected from the elements. For example, rotor 106 and stator 107 are encased in waterproof materials, are sealed against water damage, or alternatively are designed of materials for use in water. Alternatively, a bluff body is other than water resistant. For example, the necessity for a water resistant material is reduced when a BBT is for use in thermal air drafts. Of course, material selection is dependent upon an intended use for a bluff body and the present exemplary materials are merely suggestive. Another exemplary construction material of the bluff body is metal, for example steel, covered with a coating to protect the bluff body from the elements.

Figure 1B:
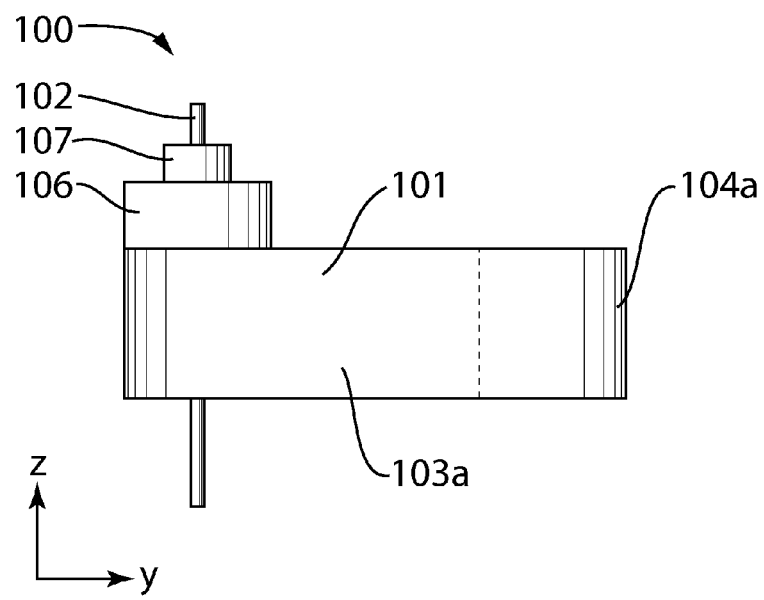

As shown in FIG. 1a and FIG. 1b, BBT 100 comprises vortex inducing features in the form of cylinders disposed with an axis of rotation along the depth of bluff body 101 (z-axis). Cylinders 104a-b are shown hollow though this need not be the case. The exterior walls of both sidewalls, 103a and 103b, including the cylinders 104a and 104b comprise a rough surface. A specific and non-limiting example of a rough surface is abrasive grinding paper, for example ANSI 60 grit (250 to 300 μm). Alternatively, the construction material is a metal and both the sidewalls are made abrasive, for example via sandblasting. Alternatively, the rough surface is implemented for enhancing the effects of the fluid flow in vortex creation and/or in responsiveness to vortices so created. Also, the absence of a back wall increases a likelihood of the vortices to shed. Alternatively, the absence of a rough surface on the back wall increases a likelihood of the vortices to shed.

Alternatively, bluff body 101 is restricted in its rotation about the axis of rotation. Alternatively, bluff body 101 is a closed body wherein corners 104a and 104b are connected via a third wall (not shown.) Further alternatively, BBT 100 is completely closed with a wall on the top and bottom of the bluff body allowing the pivot to pass through a channel through the bluff body. Alternatively, bluff body 101 is fabricated from plural pieces of material. Alternatively, vortex inducing features are other than cylindrical. Alternatively, the bluff body proximate the pivot point is one of pointed, rounded, and elliptical.

Figure 2A:
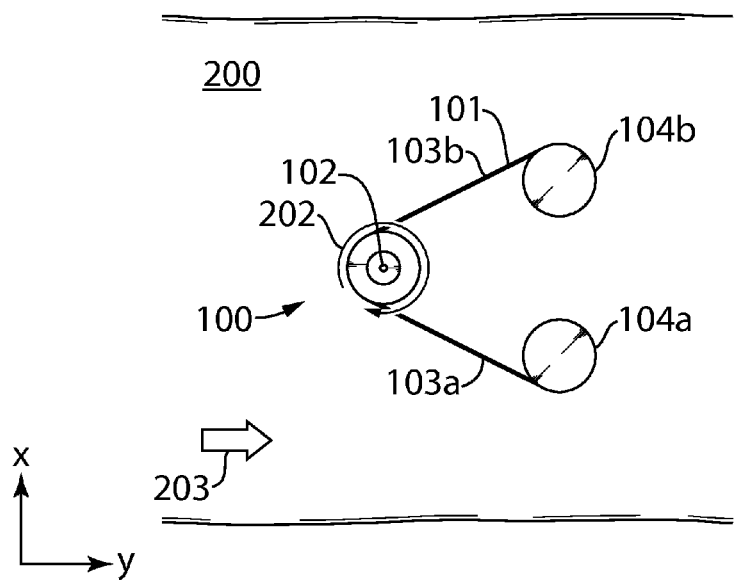
FIG. 2a is a top view of a bluff body turbine having a general wedge shape and having cylindrical vortex inducing features disposed in a river.
Figure 2B:
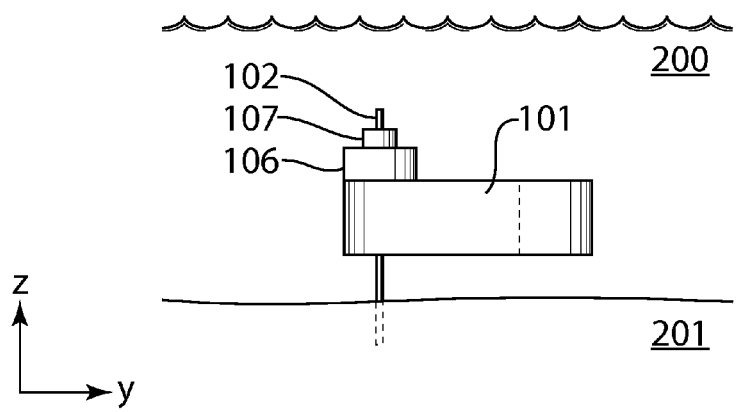
FIG. 2b is a side view of the bluff body turbine of FIG. 2a mounted onto a riverbed.
Figure 2C:
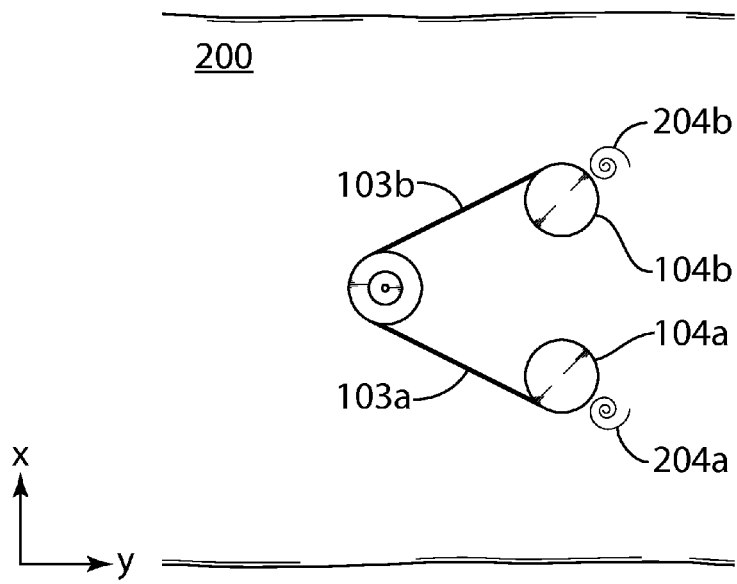
FIG. 2c is a top view of a bluff body turbine having a general wedge shape and having cylindrical vortex inducing features disposed in a river and showing water disturbance about the bluff body.

Referring to FIG. 2a, BBT 100 is disposed in a flowing fluid, for instance, in a river 200. The directional flow of river 200 is indicated by arrow 203, along the y-axis, and BBT 100 is disposed in river 200 in a downstream position. In the specific example shown in FIG. 2b, pivot 102 is mounted to the river bed 201 of river 200, such that the force of the water flow substantially other than causes pivot 102 to rotate. Alternatively, the pivot 102 is attached to a fixed structure such that the force of the water flow other than causes pivot 102 to substantially rotate. Bluff body 101 is approximately neutrally buoyant and is free to rotate 360° about pivot 102 as indicated by arrow 202. Bluff body 101 is also disposed underneath the water's surface at such an elevation as to not interfere with boats, ice formation, etc. As water flows past cylinders 104a and 104b of bluff body 101, vortices 204a and 204b form and shed proximate cylinders 104a and 104b, as shown in FIG. 2c. Alternatively, BBT 100 is disposed in a flowing fluid such as an ocean or a lake. Alternatively, BBT 100 floats on top of the water. Further alternatively, the bluff body is supported within the fluid flow by the pivot 102.

Figure 2D:
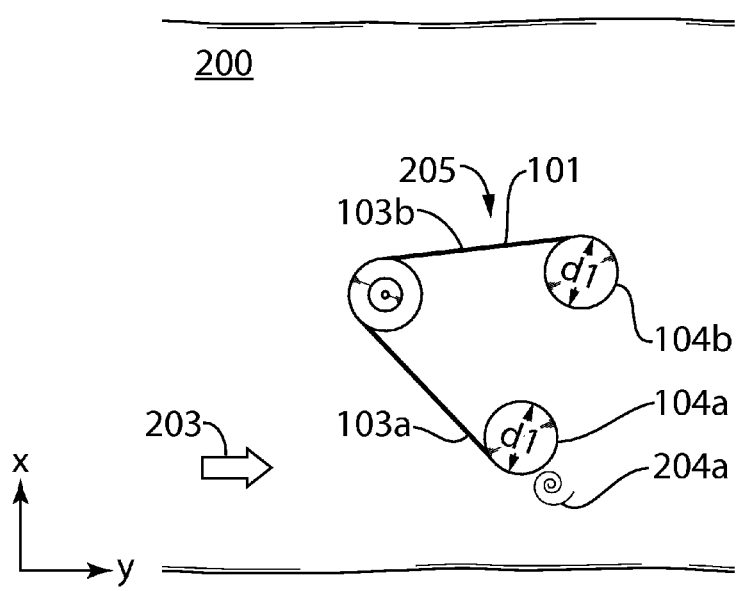
FIG. 2d is a top view of a bluff body turbine having a general wedge shape and having cylindrical vortex inducing features disposed in a river and showing motion due to the force of the river and vortex formation.

In the art of fluid dynamics, vortex formation and shedding is a known phenomenon and the forces generated are known to randomly bias bluff bodies in response thereto. Vortex shedding is a particular instance wherein the forces alternate resulting in a body oscillating frequently undesirably so. According to an embodiment of the invention a bluff body turbine is provided comprising known vortex inducing features, disposed in a flowing fluid, for passively maintaining an oscillating motion at a given fluid flow rate. Referring to FIG. 2d, shown is BBT 100. In this example, cylinders 104a and 104b have a diameter, d1. Diameter d1 is selected to optimize displacement of bluff body 101 for a known water flow rate, for example velocity V, of river 200. The water flowing along sidewall 103b, as indicated by arrow 205, causes bluff body 101 to pivot clockwise aiding in the formation of vortex 204a near cylinder 104a. Bluff body 101 moves towards the low pressure region caused by vortex 204a and, in conjunction with the force of the water pushing on sidewall 103b, bluff body 101 pivots clockwise.

Figure 2E:
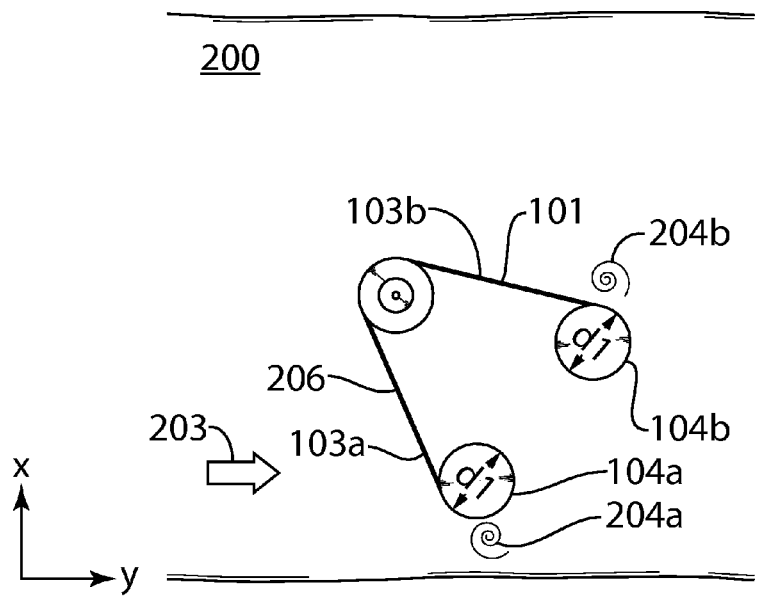
FIG. 2e is a top view of a bluff body turbine having a general wedge shape and having cylindrical vortex inducing features disposed in a river and showing shedding vortices for moving in a first direction.
Figure 2F:
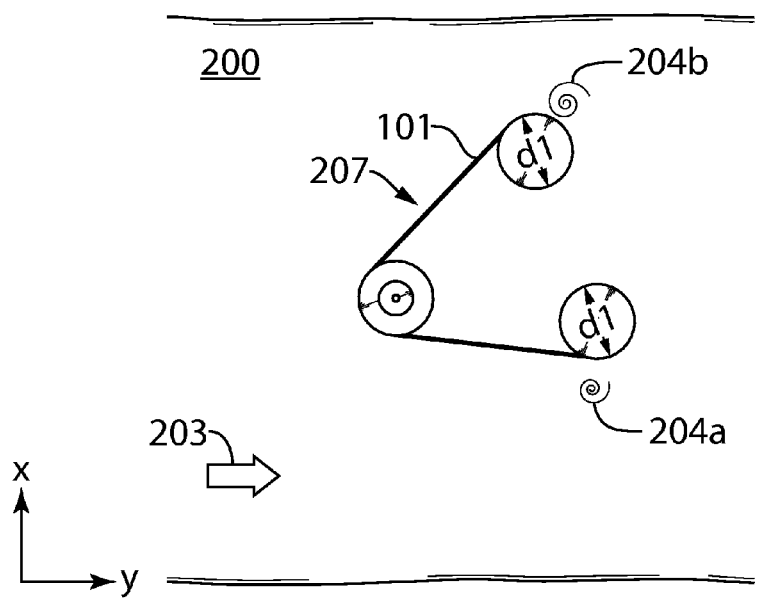
FIG. 2f is a top view of a bluff body turbine having a general wedge shape and having cylindrical vortex inducing features disposed in a river and showing shedding vortices for moving in a second other direction.

A natural balance of forces occurs between vortex 204a and the force of water pushing sidewall 103a. The force of the water acts to stop the bluff body 101 in motion and causes the shedding of vortex 204a spatially proximate to cylinder 104a. As vortex 204a is shed, the force of the river water pushes on sidewall 103a, as indicated by arrow 206, and vortex 204b forms as shown in FIG. 2e. Bluff body 101 moves towards the low pressure region caused by vortex 204b and the force of the river water pushes on sidewall 103a aiding the movement of bluff body 101 to pivot counter-clockwise. The force of the river water, as indicated by arrow 207 acts to stop motion of the bluff body 101 and aids in shedding vortex 204b spatially proximate to cylinder 104b, as shown in FIG. 2f. The alternating formation of vortices 204a and 204b—vortex shedding—causes bluff body 101 to oscillate—moving in alternating directions about the pivot. The relative motion between stator 107 and rotor 106 is used to generate electricity.

Exterior wall of sidewalls 103a and 103b and cylinders 104a-b comprise a rough surface for supporting formation of vortices 204a and 204b. A rough surface on the exterior walls of sidewalls 103a and 103b and cylinders 104a-b increases a likelihood of the vortices to form. Also, the absence of a back wall increases a likelihood of the vortices to shed. Alternatively, the absence of a rough surface on the back wall increases a likelihood of the vortices to shed. It is the formation and shedding of vortices that results in BBT 100 oscillation back and forth.

For known velocity V of river 200, diameter d1 is selected for cylinders 104a and 104b for forming vortices that bias the bluff body appropriately and such that the distance traveled by the bluff body along the x-axis is predictable and optionally optimized. In this specific and non-limiting example, the distance traveled by bluff body 101 is 1.7 times d1.

Bluff body 101 freely rotates 360° about pivot 102 allowing the harnessing of energy from the natural uneven movement of the flowing medium as well as the natural change in direction of the flow. BBT 100's design permits the uneven action of a natural flowing fluid to swing the BBT into whatever path the flowing fluid takes. The swinging motion about the pivot 102 results from formation and shedding of vortices whether they be in oscillation or not and from the fluid flow direction. Any force acting upon BBT 100 causing clockwise or counter clockwise motion causes the relative motion between the stator 107 and rotor 106 resulting in generating electricity.

Advantageously, selection of the diameter d1 allows for a passive bluff body implementation lacking any impedance matching or other mechanical biasing as the vortices form and shed in an alternating fashion for, in the absence of any external control, resulting in electricity generation. Such a passive bluff body is advantageous both due to its simplicity of manufacture and due to its simplicity of installation and use. Further, the geometry shown results in controlled vortex shedding that does not present a danger to the bluff body.

Figure 3A:
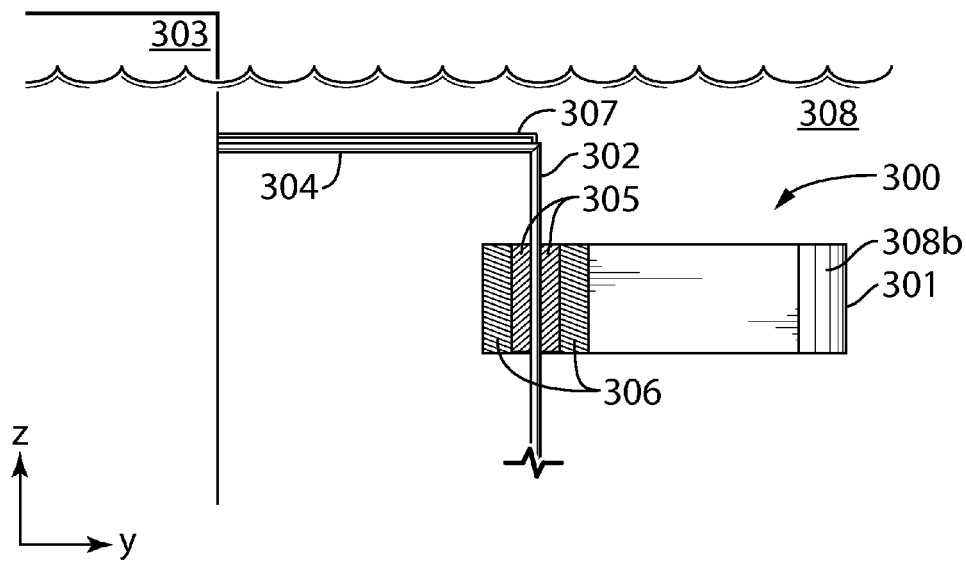
FIG. 3a is a side view of a bluff body turbine having a general wedge shape and having cylindrical vortex inducing features disposed in an ocean comprising a rotor and stator for power generation.
Figure 3B:
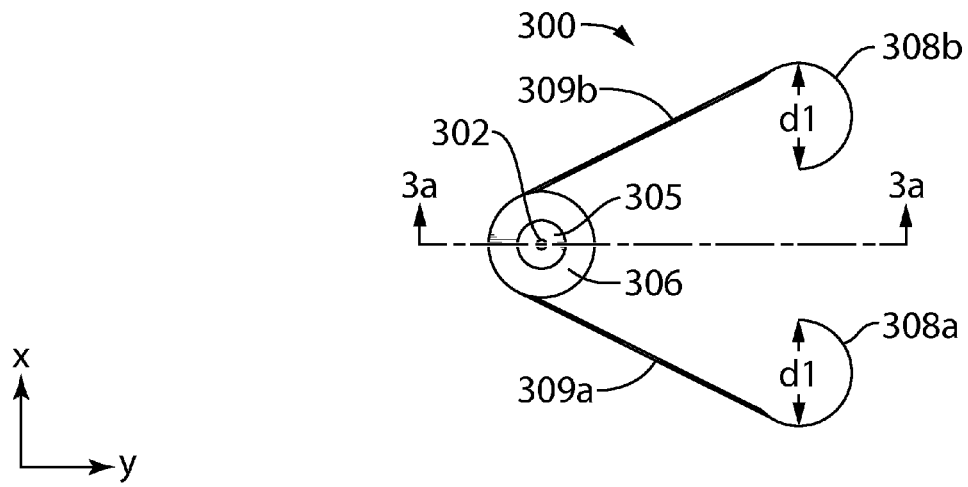

Referring to FIG. 3, shown is a BBT disposed in a flowing fluid, for example, an ocean 308. BBT 300 comprises a bluff body 301 and a pivot 302. The top of pivot 302 is coupled to a platform in the form of an oilrig 303 by arm 304. Alternatively, BBT 300 is fixed to a wharf, a rock, or another structure near or in ocean 308. BBT 300 comprises devices for power generation in the form of rotor 306 and stator 305. Bluff body 301 freely rotates 360° about pivot 302, which is in a fixed position and other than rotates. Rotor 306 is coupled to bluff body 301, and stator 305 is coupled to pivot 302, such that in use, rotor 306 moves rotationally about stator 305 as bluff body 301 moves about pivot 302. The relative motion between stator 305 and rotor 306 generates electric current that is provided to oilrig 303 via electrical cable 307. Alternatively, the power generation devices comprise two other parts and the relative motion between the two parts generates electricity.

Bluff body 301 comprises sidewalls 309a-b and vortex inducing features in the form half cylinders 308a-b. Half cylinders 308a-b are located at the opposite end of sidewalls 309a-b from pivot 302 along the length of bluff body 301, parallel to the y-axis. Sidewall 309a is facing in a first direction and sidewall 309b is facing in an approximately opposing second direction. The shape of bluff body 300 is designed to optimize the energy transfer from oceanic current forces to the electric power generation device for a known current velocity, v2, in ocean 308 near oilrig 303. Half cylinders 308a-b each have a diameter d1. Diameter d1 is selected to optimize the displacement of bluff body 301 for velocity v2. As forces of the current flow against bluff body 301, half cylinders 308a-b contribute to formation and shedding of vortices causing bluff body 301 to move about pivot 302 in an oscillating manner. For known current velocity v2, the distance traveled by bluff body 301 along the x-axis is 1.7 times diameter d1. Optionally, d1 is selected to optimize the distance traveled along the x-axis for a range of velocities, for example v1-v4. Alternatively, BBT 300 is coupled to oilrig 303 via an arm attached to the bottom of pivot 302. Alternatively, the end of the bluff body disposed into the fluid flow is one of a point, round, and elliptical.

Alternatively, the diameter of half-cylinder 308a is different than the diameter of half-cylinder 308b. BBT 300 is optimized for two fluid flow rates, one for 308a and 308b.

Figure 4A:
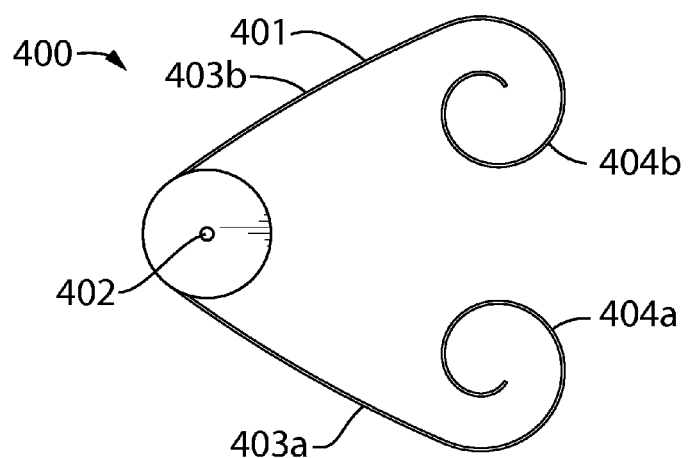
FIG. 4a shows an exemplary vortex inducing feature.
Figure 4B:
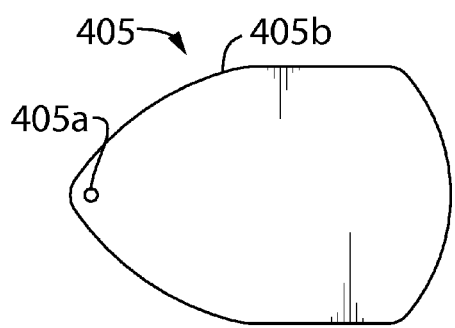
FIG. 4b shows another exemplary vortex inducing feature.
Figure 4C:
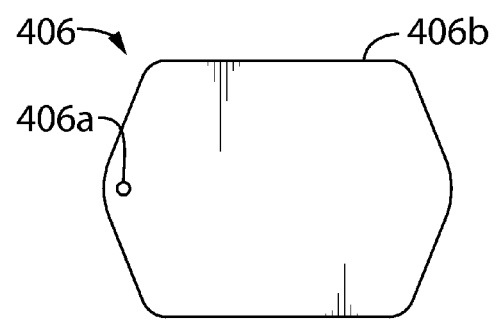
FIG. 4c shows another exemplary vortex inducing feature.

Shown in FIGS. 4b-c, BBTs 405 and 406 comprise vortex inducing features. Alternatively, vortex inducing features are other than enclosed shapes. For example, shown in FIG. 4a is BBT 400 in the shape of a golden spiral comprising vortex inducing features 404a-b.

Shown in FIG. 4a is a bluff body turbine comprising pivot 402 and a bluff body 401 comprising sidewalls 403a-b and vortex inducing features 404*a-b*. Sidewall 403*a* and vortex inducing feature 404*a* form a first golden spiral facing in a first direction. Sidewall 403*b* and vortex inducing feature 404*b* form a second golden spiral facing in an approximately opposing second direction. Bluff body 401 freely rotates 360° about pivot 402, which is in a fixed position and other than rotates. BBT 400 also comprises devices for power generation (not shown) in the form of a rotor and stator. The rotor is coupled to bluff body 401, and the stator is coupled to pivot 402, such that in use, the rotor moves rotationally about the stator as bluff body 401 moves about pivot 402. The relative motion between the stator and the rotor generates electric current.

BBT 400 is designed to optimize the energy transfer from fluid flow forces to the electric power generation device for a known fluid flow rate, for example, v2. Bluff body 401 is shaped to cause and maintain an oscillatory formation and shedding of vortices causing bluff body 401 to move about pivot 402 in a substantially consistent oscillating manner for a known fluid flow rate, v2. Disposed in a flowing fluid moving at velocity v2, vortices form alternately on both sides of bluff body 401—vortex shedding—causing it to oscillate in a clockwise and counter clockwise rotation.

Figure 4D:
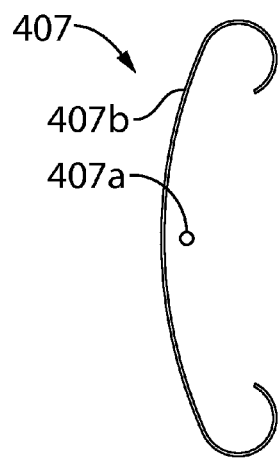
FIG. 4d shows another exemplary vortex inducing feature.

Referring to FIGS. 4*b*-4*d*, shown are BBT 405-407, respectively. The bluff body shape for each of bluff bodies 405*b*-407*b* is shaped to cause and maintain an oscillatory formation and shedding of vortices causing bluff bodies 405*b*-407*b* to move about pivots 405*a*-407*a*, respectively, in a substantially consistent oscillatory manner for a known fluid flow rate, v2. Disposed in a flowing fluid moving at velocity v2, vortices from bluff bodies 405*b*-407*b* cause adjacent bluff bodies to move alternately in a clockwise and counter clockwise rotation.

Although the absence of a back wall increases a likelihood of the vortices to shed, FIGS. 4*e* and 4*f*, show BBTs with back walls that are optimal shapes for increasing the lift or rotational strength of the BBT.

According to an embodiment of the invention, a BBT comprises a plurality of vortex inducing features in the form of curved corners having a diameter d, for example as defined by the Strouhal number. The vortex shedding frequency of any bluff body is defined by the Strouhal number of the flow. The Strouhal number represents the non-dimensional vortex shedding frequency defined as St=fD/U where D is the dimension of the bluff body perpendicular to the oncoming flow, U is the flow speed and f is the vortex shedding frequency. If the diameter of the bluff body corner is constant and the speed of the flow increases then the frequency of vortex shedding decreases and thus the energy output decreases when the flow exceeds a flow for the diameter of the bluff body corners.

Figure 5A:
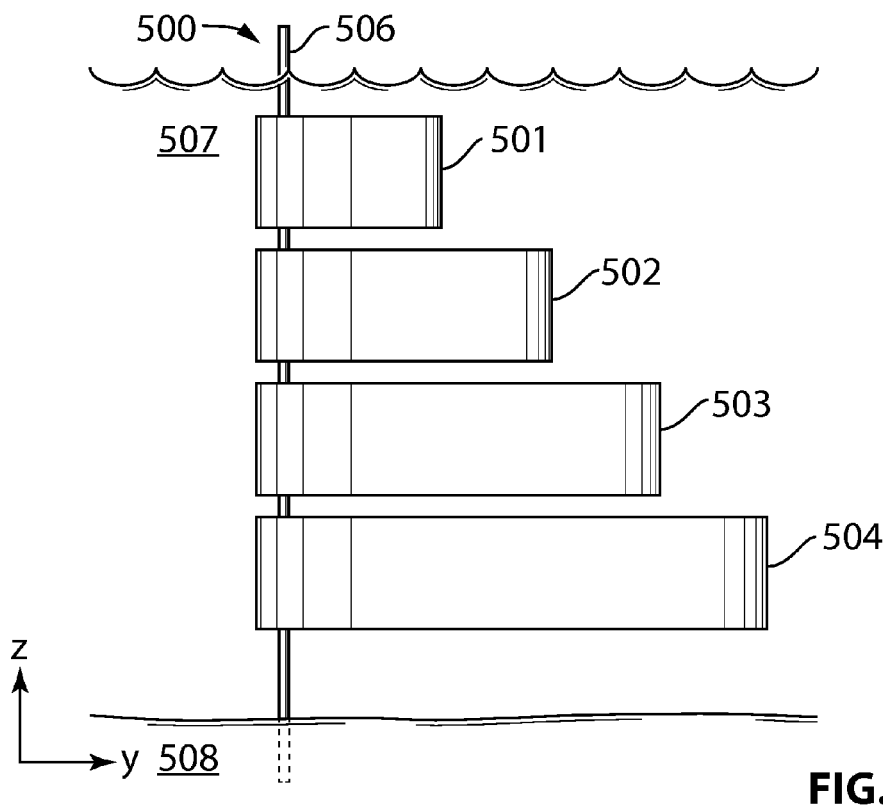
FIG. 5a is a side view of a bluff body turbine comprising a plurality of bluff bodies, each designed for a different fluid flow rate.
Figure 5B:
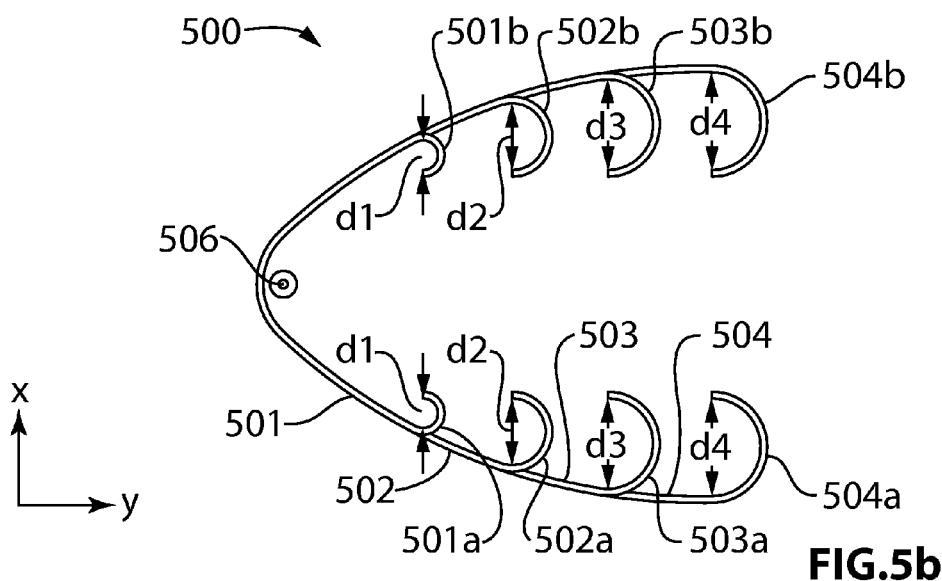

Shown in FIG. 5*a* and FIG. 5*b* is a BBT according to an embodiment of the invention. BBT 500 is disposed in a flowing fluid, for example river 507, and comprises a plurality of bluff bodies of various diameters and pivot 506. Bluff bodies 501-504 are disposed vertically along pivot 506 and are free to rotate 360° around pivot 506 which is mounted to the river bed 508 of river 507, such that the force of the water flow substantially other than causes pivot 506 to rotate. Alternatively, the pivot 506 is attached to a fixed structure such that the force of the water flow substantially other than causes pivot 506 to rotate. In this example, bluff bodies 501-504 are other than attached to one another and rotate about pivot 506 independently. BBT 500 also comprises power generators (not shown) in the form of rotors and stators. A rotor is coupled to each of the bluff bodies 501-504, and a stator is coupled to pivot 506 near each rotor, such that in use, a rotor moves rotationally about a stator as bluff bodies 501-504 moves about pivot 506. The relative motion between each stator and rotor generates electric current. Alternatively, a stator is attached to each bluff body and a rotor is disposed within the pivot 506.

The vortex shedding frequency of any bluff body is defined by the Strouhal number of the fluid flow. The Strouhal number represents the non-dimensional vortex shedding frequency defined as St=fD/U, where D is the dimension of the bluff body perpendicular to the oncoming flow, U is the flow speed and f is the vortex shedding frequency. An increase in the fluid flow rate, for a bluff body of known diameter, causes the frequency of vortex shedding to decrease and thus the energy output decreases.

For example, BBT 500 is designed to optimize energy transfer from a single body of water, river 507, of varying fluid flow rates. Each bluff body 501-504 comprises vortex inducing/shedding shapes in the form of half cylinders, 501*a*-*b*-504*a*-*b* respectively, of varying diameters. For example, half cylinders 501*a*-*b* have diameter d1, half cylinders 502*a*-*b* have diameter d2, and so forth. As the fluid flow rate of river 507 increases, the frequency of the vortex shedding decreases. For example, bluff body 501, comprising half cylinders of diameter d1, is designed to optimize energy transfer from river 507 to BBT 500 for known fluid flow rate f1. River 507 flow rate increases from f1 to f2, wherein f1<f2, reducing the vortex shedding frequency and correspondingly reducing the energy transfer from river 507 to BBT 500. Bluff body 502, comprising half cylinders of diameter d2, wherein in d1<d2, is designed to optimize energy transfer from the river to BBT 500 for known fluid flow rate f2. As river 507 flow rate increases, the diameter of the bluff body must also increase to maintain optimal energy transfer from river forces to BBT 500. The shape of bluff bodies 501-504 are designed with half cylinder diameters d1-d4, respectively, to optimize energy transfer from the river forces to BBT 500 for fluid flow rates f1-f4, respectively. Wherein in d1<d2<d3<d4 and f1<f2<f3<f4. In other words, as one range of Strouhal numbers is exceeded for one diameter the second diameter picks up the next range of Strouhal numbers and continues to shed vortices at a frequency chosen for energy production. Also, as river 507 flow rate decreases, the diameter of the bluff body optimally also decreases to maintain optimal energy transfer from river forces to BBT 500. Alternatively, bluff bodies 501-504 are coupled together as a single body along the z-axis and only one stator is coupled to pivot 506 and one rotor is coupled to the single body.

Though described hereinabove is a diameter for a particular flow rate, it is understood that by shaping the bluff body in accordance with the present embodiment, a single bluff body will oscillate over a range of fluid flow rates, though one particular fluid flow rate likely remains optimal. Thus, by using four (4) bluff bodies as shown, the range can be extended significantly to encompass a larger range. Alternatively, non contiguous ranges are used to account for different conditions such as spring, summer, autumn, and winter.

Alternatively, the bluff body is for operation when inserted within another fluid flow such as air flow, for example wind.

Figure 6A:
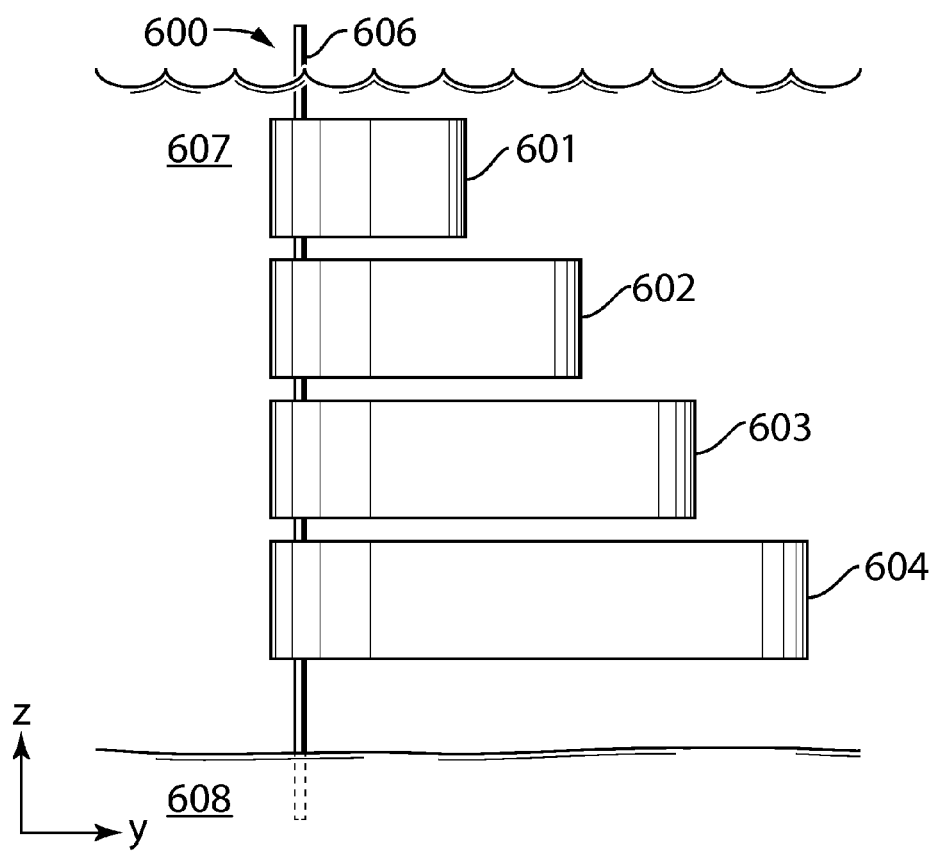
FIG. 6a is a side view of a bluff body turbine comprising a plurality of bluff bodies, each designed for a same fluid flow rate.
Figure 6B:
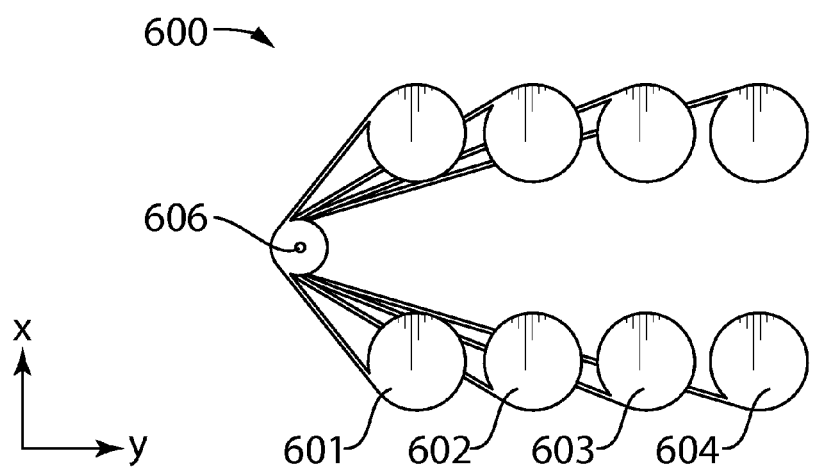

Shown in FIG. 6*a* and FIG. 6*b* is a bluff body turbine comprising a plurality of bluff bodies of the same diameters pivoted on a single pivot for optimizing energy transfer from a single body of water of a constant range of fluid flow rates. BBT 600 is disposed in river 607 and comprises pivot 606 mounted to riverbed 608 such that the force of the water flow substantially other than causes pivot 606 to rotate. Bluff bodies 601-604 are vertically disposed along, and are free to rotate 360° about, pivot 606. BBT 600 also comprises power generators (not shown) in the form of rotors and stators. A rotor is coupled to each of the bluff bodies 601-604, and a stator is coupled to pivot 606 near each rotor, such that in use, a rotor moves rotationally about a stator as bluff bodies 601-604 moves about pivot 606. Alternatively, a stator is coupled to each of the bluff bodies 601-604, and a rotor is coupled to pivot 606 near each stator, such that in use, a stator moves rotationally about a rotor as bluff bodies 601-604 moves about pivot 606. The relative motion between each stator and rotor generates electric current.

Figure 7A:
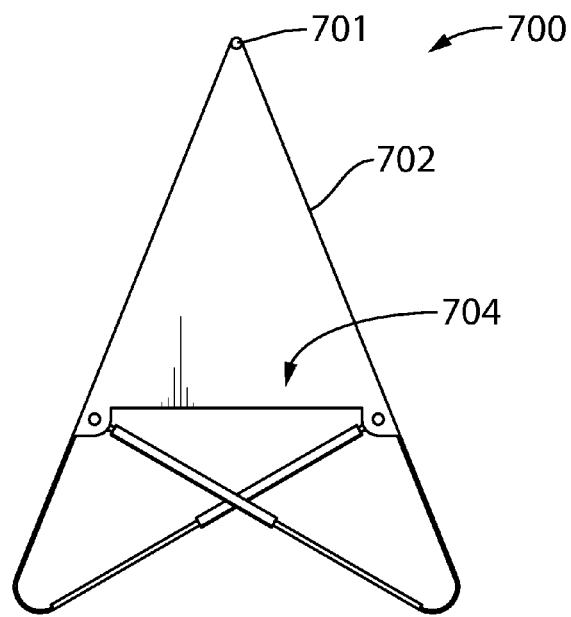
FIG. 7a is a top view of a bluff body turbine having a modifiable shape for tuning operation thereof, shaped in a first shape.
Figure 7B:
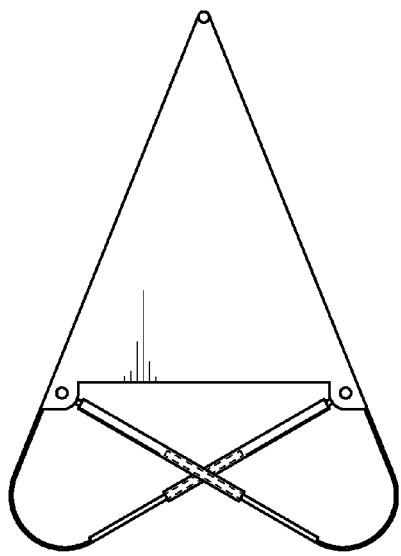
FIG. 7b is a top view of a bluff body turbine having a modifiable shape for tuning operation thereof, shaped in a second shape.
Figure 7C:
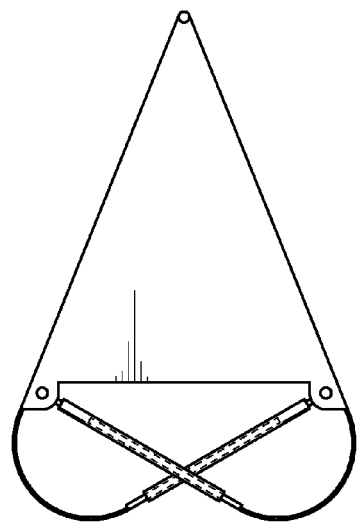
FIG. 7c is a top view of a bluff body turbine having a modifiable shape for tuning operation thereof, shaped in a third shape.

Referring to FIG. 7, a bluff body turbine comprising adjustable mechanisms for modifying the shape of a bluff body comprised therein is shown. BBT 700 comprises bluff body 702 and pivot 701 about which bluff body 702 freely rotates. BBT 700 also comprises devices for power generation, a first part and a second part (not shown.) The first part is coupled to bluff body 702, and the second part is coupled to pivot 701 and in use, the relative motion between the two parts generates electricity.

The shape of BBT 700 is modifiable via a mechanical mechanism, for example brace 704 such that it accommodates various fluid flow rates for use in fluid bodies with varying flow rates. Tuning of the bluff body shape to adjust for flow rate changes or to calibrate a bluff body for a new fluid flow avoids electrical and electronic tuning circuits while supporting a more near optimum operation. Bluff body 702 construction material comprises flexible material, for example rubber. Optionally, the bluff body 702 comprises a flexible metallic skeleton.

Alternatively, a back wall of the bluff body of FIG. 7 closes the back of the approximately triangular bluff body and expands and contracts in response to tuning of the bluff body shape resulting in a bluff body having variable diameter rear corners for use in current generation when disposed within a fluid flow.

Figure 8:
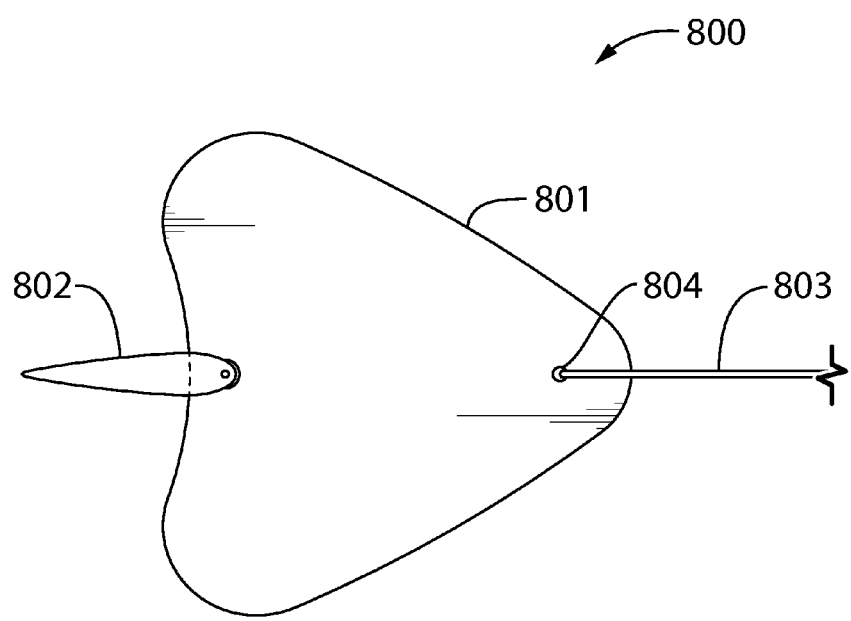
FIG. 8 is a bluff body turbine wherein the power generation through relative motion about a pivot is a pivot at which the bluff body turbine is other than supported.

Referring to FIG. 8, shown is apparatus 800 comprising a bluff body 801 for relatively oscillating about pivot 802. The bluff body 801 need not be supported by pivot 802 and here, pivot 802 is provided with a fin for maintaining the pivot relative to the oscillating bluff body while the bluff body 801 is supported at 804 by tether 803.

For the embodiments described above, exterior walls of a BBT and vortex inducing features optionally comprise a rough surface which increases a likelihood of vortices to form. Also, the absence of a back wall increases a likelihood of the vortices to shed. Alternatively, the absence of a rough surface on the back wall increases a likelihood of the vortices to shed. It is the formation and shedding of vortices that results in BBT oscillation back and forth.

Figure 9:
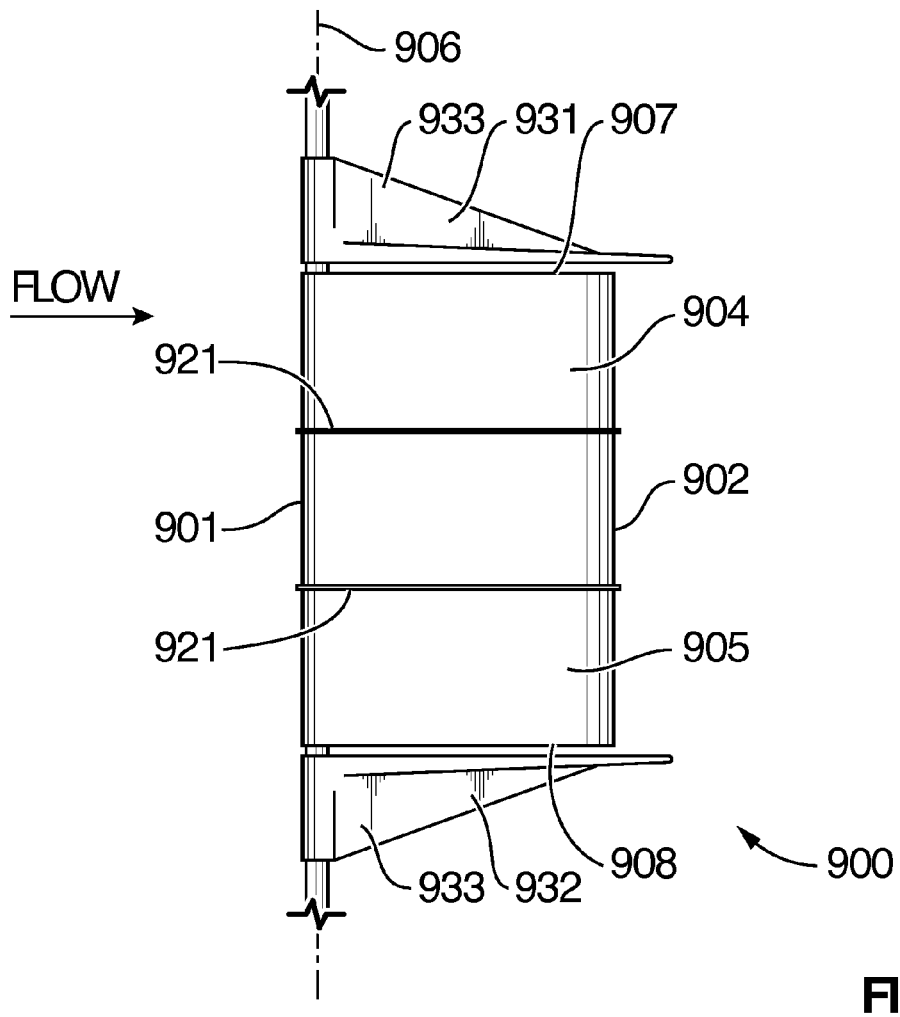
FIG. 9 is a side view of a bluff body having vortex separation vanes and a top and a bottom cap.
Figure 10:
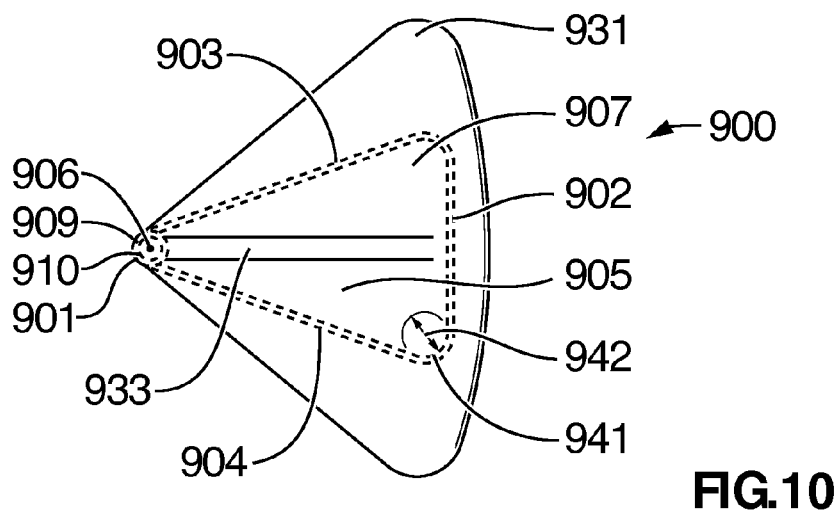
FIG. 10 is a top view of a bluff body having vortex separation vanes and a top and a bottom cap.

Referring to FIG. 9 and FIG. 10 shown is another embodiment of a bluff body turbine (BBT) 900. BBT 900 is disposed in a flowing fluid, for example a river, and comprises a single bluff body 905. The bluff body is disposed within the river with an apex 901 thereof facing the river's flow and a back wall 902 thereof facing away from the river's flow. The sides 903 and 904 of the bluff body 905 are angled for engaging the fluid flowing within the river and for resulting in vortices for moving the bluff body 905 about a pivot 906. The bluff body has a top side 907 and a bottom side 908 at opposing ends of the pivot 906 and the sides 903, 904 and the back wall 902.

BBT 900 also comprises power generators (not shown in FIG. 10 only) in the form of a rotor 909 and stator 910. The rotor 909 is coupled to the bluff body 905, and the stator 910 is coupled to the pivot 906 near the rotor, such that in use, the rotor 909 moves rotationally about the stator 910 as the bluff body 905 moves about pivot 906. The relative motion between each stator and rotor generates electric current. Alternatively, the stator 910 is attached to each bluff body and the rotor 909 is disposed within the pivot 906.

Bluff body 905 comprises vortex separation vanes 921. These vortex separation vanes 921 apparently act to limit vortex translation up and down the bluff body 905 and to confine fluid flow along the edge of the bluff body from the pivot 906 to the back wall 902. Further, the BBT 900 incorporates a top cap 931 at a top end of the bluff body 905 and a bottom cap 932 at a bottom end of the bluff body 905 for vortex separation. The top cap 931 and the bottom cap 932 are shaped to reduce vortex formation along the back due to a transition from the top 907 to the back wall 902 or from a bottom 908 to the back wall 902. As shown, the top cap 931 and the bottom cap 932 extend beyond the back wall 902 of the bluff body 905 thereby preventing vortices at a junction of the top 907 and the back wall 902 from forming and to prevent vortices at the junction of the bottom 908 and the back wall 902 from forming. Vortices that emanate from the top 907 are generally not correctly oriented for producing optimal bluff body rotation. Similarly, vortices that emanate from the bottom 908 are generally not correctly oriented for producing optimal bluff body rotation. Optionally as shown, the top cap 931 extends beyond both sides 903 and 904 of the bluff body 905 in order to limit vortices formed at or about the junction between the sides 903 and 904 and the top 907 of the bluff body 905. Further optionally as shown, the bottom cap 932 extends beyond both sides 903 and 904 of the bluff body 905 in order to limit vortices formed at or about the junction between the sides 903 and 904 and the bottom 908 of the bluff body 905. The top cap 931 and the bottom cap 932 are shown disposed for free rotation within the river and are each provided with a fin 933 for maintaining orientation thereof. Alternatively, the top cap 931 and the bottom cap 932 are fixed.

Alternatively, the bluff body is for operation when inserted within another fluid flow such as airflow, for example wind.

Referring again to FIG. 10, junctions between the sides 903 and 904 and the back wall are shown as a curved corner 941 having a diameter of curvature 942. This diameter is typically determined with reference to vortex formation and shedding as described above. This diameter of curvature of the corners between the sides and the back wall 902 of the bluff body 905 was used to define the vortex separation vane spacing. It is shown at approximately 10 times the diameter of curvature. Alternatively, it is less than 10 times the diameter of curvature and is the range of 7-10 times the diameter of curvature. Further alternatively, it is more than 10 times the diameter of curvature and is between 10-20 times the diameter of curvature. Alternatively, other ratios between the diameter of curvature and the vane spacing are used.

Referring to FIGS. 11 (*a*) and 11 (*b*), shown are several other geometries for the bluff body. In FIG. 11 (*a*) a top view of a bluff body is shown, the bluff body having a rounded back wall. The cross section of the bluff body is relatively consistent from the top to the bottom with an exception for vortex separation vanes when used. In FIG. 11 (*b*) a top view of a bluff body is shown, the bluff body having a back formed of a first back surface and a second back surface. The cross section of the bluff body is relatively consistent from the top to the bottom with an exception for vortex separation vanes when used.

In both embodiments, the back of the bluff body is shaped for facing in more than one direction simultaneously. In other words, there exist lines normal to the surface of the back of the bluff body that are not parallel. In (a) this is achieved by curving the back wall whereas in (b) this is achieved by having two back surfaces at an angle, one to the other. By having the lines normal to the surface other than cross each other, eddies formed at the corners are presented with more lateral surface area to oppose and less inter-eddy interference and therefore, it appears that bluff body efficiency is increased. Eddies simultaneously acting on the bluff body and interfering one with another are less likely given the geometries shown, for example in the geometry of FIG. 11 (*b*) the eddies travel along different backsides depending on the corner proximate which they are formed. Thus, eddies only interact at the corner between the two different back surfaces. In contrast, when the back wall is a single flat surface, the size of the eddies will indicate how they interfere in operation and effect on the same back surface.

Referring to FIG. 12, shown is a side view of a bluff body turbine 1200 having a top cap 1231 and a bottom cap 1232. The top and bottom caps extend beyond the bluff body 1205 and curve downward to prevent interference with the bluff body forces by vortices formed in relation to the top cap 1231 or the bottom cap 1232. Of course, other variants are also possible such as with the top and bottom caps extending laterally without a curved portion and so forth.

Figure 13A:
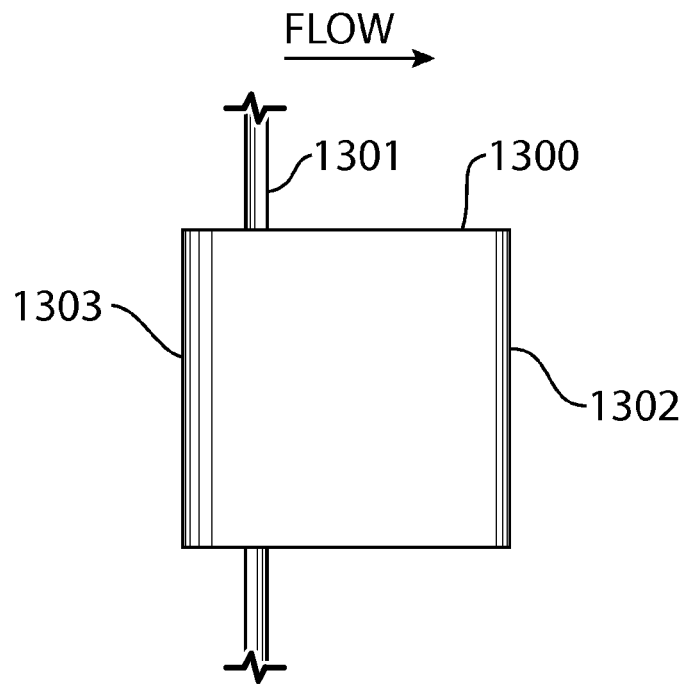
FIG. 13A is a side view of a bluff body having a pivot placed close to the back wall.
Figure 13B:
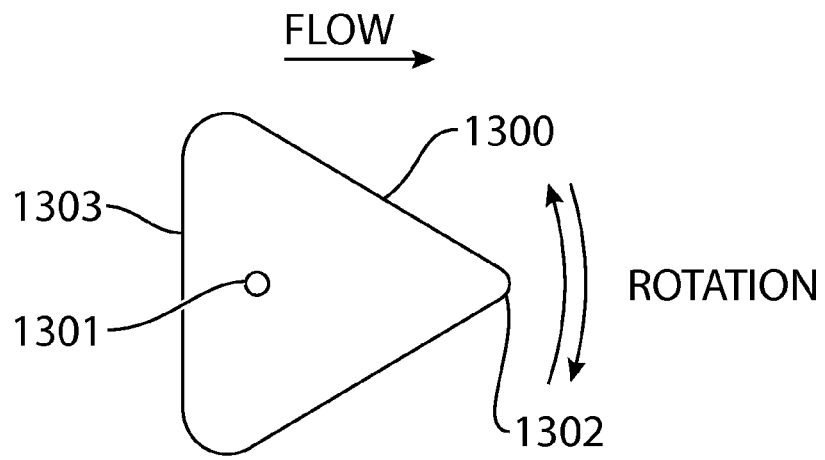
FIG. 13B is a top view of a bluff body having a pivot placed close to the back wall.

Shown in FIG. 13 is a bluff body 1300 according to an embodiment. The pivot 1301 is disposed closer to surface 1303 than to back wall 1302. When placed in a flowing fluid, the bluff body 1300 rotates such that the surface 1303 is now facing the flow of the water and the back wall 1302 is facing downstream. Disposing the pivot 1301 in such a position apparently increases the movement of the bluff body 1300. In a specific and non-limiting example, the rotation of the bluff body 1300 increases up to 90 degrees above the pivot 1301 in comparison to a rotation of approximately 40 degrees when the pivot 1301 is disposed near the back wall 1302. In a second specific and non-limiting example, the rotational frequency of the bluff body 1300 increases from 4-5 seconds when the pivot is disposed near the back wall 1302 in comparison to a rotational frequency of every 2 seconds when the pivot is disposed near the surface 1303. BBT 1300 also comprises devices for power generation, a first part and a second part (not shown.) The first part is coupled to bluff body 1300, and the second part is coupled to pivot 1301 and in use, the relative motion between the two parts generates electricity.

The embodiments presented are exemplary only and persons skilled in the art would appreciate that variations to the embodiments described above may be made without departing from the scope of the invention. The scope of the invention is solely defined by the appended claims.

What is claimed is:

1. An apparatus for generating electric current, comprising:
   a pivot;
   a three dimensional triangular shaped bluff body having a triangular cross section and comprising:
      a first sidewall and a second sidewall coupled together at an apex for being directed into the fluid flow;
      an opening for mating with the pivot for supporting rotation of the bluff body thereabout;
      at least a back wall;
      a second rounded corner opposite the apex and between the first sidewall and the back wall;
      a third rounded corner opposite the apex and between the second sidewall and the back wall;
      a first vortex separation vane along each of the first and second sidewalls, the vortex separation vane extending in a direction of fluid flow, for when disposed in a flowing fluid with velocity v1 resulting in vortex shedding for inducing a predetermined oscillating movement about the pivot for resulting in relative motion between the pivot and the bluff body; and
   a generator coupled between the pivot and the bluff body for generating electric current in response to the relative motion.

2. The apparatus according to claim 1, further comprising a second vortex separation vane spaced from the first vortex separation vane, wherein the second rounded corner and the third rounded corner each have a diameter of curvature, and wherein the first vortex separation vane and the second vortex separation vane are separated by a distance of between 7 and 20 times the diameter of curvature.

3. The apparatus according to claim 2, further comprising a top cap disposed at a top of the bluff body and extending beyond at least a back wall along the direction of fluid flow.

4. The apparatus according to claim 3, further comprising a bottom cap disposed at a bottom of the bluff body and extending beyond the at least a back wall along the direction of fluid flow.

5. The apparatus according to claim 4, wherein the top cap and the bottom cap are parts separate from the bluff body and disposed adjacent thereto for supporting relative movement between the bluff body and each of the top cap and the bottom cap.

6. An apparatus for generating electric current, comprising:
   a pivot;
   a bluff body for being disposed within a flow of a fluid, comprising:
      a first sidewall and a second sidewall joined via an apex;
      an opening defined within the bluff body at a location between the first sidewall and the second sidewall, the opening for receiving the pivot for supporting relative rotational movement between the bluff body and the pivot;
      at least a back wall;
      a second rounded corner opposite the apex and between the first sidewall and the back wall;
      a third rounded corner opposite the apex and between the second sidewall and the back wall;
      a vortex separation vane, which projects from the first side wall and extends between the apex and the second rounded corner, and which projects from the second side wall and extends between the apex and the third rounded corner; and
   a generator coupled between the pivot and the bluff body for generating electric current in response to the relative rotational movement.

7. The apparatus according to claim 6, further comprising a second vortex separation vane spaced from the first vortex separation vane, wherein the second rounded corner and the third rounded corner each have a diameter of curvature, and wherein the first vortex separation vane and the second vortex separation vane are separated by a distance of between 7 and 20 times the diameter of curvature.

8. The apparatus according to claim 7, further comprising a top cap disposed at a top of the bluff body and extending beyond at least a back wall along the direction of fluid flow.

9. The apparatus according to claim 8, further comprising a bottom cap disposed at a bottom of the bluff body and extending beyond the at least a back wall along the direction of fluid flow.

10. The apparatus according to claim 9, wherein the top cap and the bottom cap are parts separate from the bluff body and disposed adjacent thereto for supporting relative movement between the bluff body and each of the top cap and the bottom cap.

11. The apparatus according to claim 6, wherein the location of the opening is relatively closer to the apex than to the back wall and the apex is directed into the flow of the fluid.

12. The apparatus according to claim 6, wherein the location of the opening is relatively closer to the back wall than to the apex and the back wall is directed into the flow of the fluid.

13. An apparatus for generating electric current, comprising:
- a pivot;
- a bluff body for being disposed within a flowing fluid, the bluff body comprising:
    - first and second sidewalls that converge one toward the other to form an apex of the bluff body;
    - an opening defined within the bluff body at a location that is between the first and second sidewalls, the opening for receiving the pivot for supporting relative rotational movement between the bluff body and the pivot;
    - a back wall disposed opposite the apex and extending between the first and second sidewalls;
    - a first vortex separation vane projecting orthogonally from each of the first and second sidewalls and extending along each of the first and second sidewalls from the apex to the back wall;
    - a second vortex separation vane projecting orthogonally from each of the first and second sidewalls and extending along each of the first and second sidewalls from the apex to the back wall, the second vortex separation vane being spaced-apart from and parallel to the first vortex separation vane; and
- a generator coupled between the pivot and the bluff body for generating electric current in response to the relative rotational movement.

14. The apparatus according to claim 13, wherein the back wall meets the first and second sidewalls at respective rounded corners each having a diameter of curvature, and wherein the first vortex separation vane and the second vortex separation vane are separated by a distance of between 7 and 20 times the diameter of curvature.

15. The apparatus according to claim 13, further comprising a top cap disposed at a top of the bluff body and extending beyond the back wall of the bluff body.

16. The apparatus according to claim 15, further comprising a bottom cap disposed at a bottom of the bluff body and extending beyond the back wall of the bluff body.

17. The apparatus according to claim 16, wherein the top cap and the bottom cap are parts separate from the bluff body and are disposed adjacent thereto for supporting relative movement between the bluff body and each of the top cap and the bottom cap.

18. The apparatus according to claim 13, wherein the location of the opening is relatively closer to the apex than to the back wall and the apex is directed into the flow of the flowing fluid.

19. The apparatus according to claim 13, wherein the location of the opening is relatively closer to the back wall than to the apex and the back wall is directed into the flow of the flowing fluid.

* * * * *